(12) United States Patent
Enomoto et al.

(10) Patent No.: US 6,373,958 B1
(45) Date of Patent: Apr. 16, 2002

(54) ELECTRICAL/MECHANICAL/SOUND CONVERTER AND APPARATUS OF ELECTRICAL/MECHANICAL/SOUND CONVERSION

(75) Inventors: Mitsutaka Enomoto, Mie; Masakuni Hirata, Osaka; Takanori Fukuyama, Mie; Mitsukazu Kuze, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/486,655

(22) PCT Filed: Jun. 29, 1999

(86) PCT No.: PCT/JP99/03504

§ 371 Date: May 31, 2000

§ 102(e) Date: May 31, 2000

(87) PCT Pub. No.: WO00/00299

PCT Pub. Date: Jan. 6, 2000

(30) Foreign Application Priority Data

Jun. 29, 1998 (JP) .......................... 10-181857

(51) Int. Cl.$^7$ .............................................. H04R 25/00
(52) U.S. Cl. ....................... 381/406; 381/396; 381/401; 340/388.1; 340/388.2
(58) Field of Search ................. 381/150–151, 381/191, 396, 398, 400, 402, 401, 406, 408, 409, FOR 152, FOR 153, FOR 155; 340/7.6, 311.1, 388.1, 407.1, 388.2

(56) References Cited

U.S. PATENT DOCUMENTS

| | | | | |
|---|---|---|---|---|
| 3,997,724 A | * | 12/1976 | Seebinger | 381/150 |
| 4,675,907 A | * | 6/1987 | Itagaki et al. | 381/152 |
| 5,436,622 A | * | 7/1995 | Gutman et al. | 340/825.46 |
| 5,524,061 A | * | 6/1996 | Mooney et al. | 381/151 |
| 5,528,697 A | * | 6/1996 | Saito | 381/396 |
| 5,894,263 A | * | 4/1999 | Shimakawa et al. | 381/400 |
| 5,956,622 A | * | 9/1999 | Lee | 381/396 |
| 6,208,237 B1 | * | 3/2001 | Saiki et al. | 381/151 |

FOREIGN PATENT DOCUMENTS

| | | |
|---|---|---|
| JP | 2-48084 | 2/1990 |
| JP | 8-238901 | 9/1996 |
| JP | 9-52071 | 2/1997 |
| JP | 10-174408 | 6/1998 |

OTHER PUBLICATIONS

Japanese search report for PCT/JP99/03504 dated Oct. 5, 1999.

English translation of Form PCT/ISA/210.

* cited by examiner

Primary Examiner—Stella Woo
Assistant Examiner—Suhan Ni
(74) Attorney, Agent, or Firm—Ratner & Prestia

(57) ABSTRACT

An electro-mechanical-audio converter and an electro-mechanical-audio converting device using the same employed in mobile terminals such as mobile phones for generating paging vibration which realizes stable vibration function. The electro-mechanical-audio converter includes a housing (1a), movable part (2), forming a magnetic circuit, mounted on an opening of the housing (1a) through a suspension (3); and a detection coil (11) disposed near the movable part (2) for generating excitation voltage by vibration of the movable part (2). Strong vibration of the movable part (2) during resonance is detected by the detection coil (11) as an excitation voltage, and fed back. Accordingly, the electro-mechanical-audio converter and electro-mechanical-audio converting device using the same having an extremely stable vibration function, even when resonance frequency changes due to environmental changes such as ambient temperature, is made feasible.

14 Claims, 9 Drawing Sheets

ELECTRICAL/MECHANICAL/SOUND CONVERTER AND APPARATUS OF ELECTRICAL/MECHANICAL/SOUND CONVERSION

THIS APPLICATION IS A U.S. NATIONAL PHASE APPLICATION OF PCT INTERNATIONAL APPLICATION PCT/JP98/03504.

FIELD OF THE INVENTION

The present invention relates to the field of electro-mechanical-audio converters and electro-mechanical-audio converting devices using the same employed as incoming call alerts for generating paging sounds and vibrations in mobile terminals including mobile phones, pagers, and PHSs (Personal Handy Phone SystemSets).

BACKGROUND OF THE INVENTION

Mobile terminals, including mobile phones, pagers, and PHSs (Personal Handy Phone Sets) conventionally employ both an electro-mechanical-audio converting device, usually having an electro-mechanical-audio converter for its key part that generates beep sounds, and the one using the rotation of a motor that generates vibration to allow the user to select a beep or vibration to announce an incoming call. However, the use of a single electro-mechanical-audio converting device for both beep sounds and vibration is currently being proposed.

FIGS. 7 to 11 show a conventional electro-mechanical-audio converting device.

First, an electro-mechanical-audio converter, which is a key part of the device, is described. A reference numeral 1 is a housing which has an opening on its both ends. A reference numeral 2 is a movable part which has a yoke 2a mounted on the housing 1 through a suspension 3, magnet 2b, and plate 2c. A reference numeral 4 is a vibrating plate connected to a top end of voice coil 5 which includes a coil bobbin and a coil wound around the coil bobbin inserted to a magnetic gap 2d of the movable part 2. The vibrating plate 4 is also mounted on the other opening of the housing 1.

Operation of this electro-mechanical-audio converter is described next. The movable part 2 including the suspension 3 creates a mechanical resonance system by its mass and the stiffness of the suspension 3, and has its inherent resonance frequency. The vibrating plate 4 connected to the voice coil 5 also has its inherent resonance frequency by its stiffness and mass.

An electric signal applied to the voice coil 5 generates an action and reaction between the voice coil 5 and movable part 2. The electric signal matching the inherent resonance frequency of the movable part 2 strongly vibrates the movable part 2. Its vibration power is transmitted to the housing 1 through the suspension 3, and notifies the user by the feel of a vibration. When the electric signal matches the inherent resonance frequency of the vibrating plate 4 connected to the voice coil 5, the vibrating plate 4 strongly vibrates, and generates a beep sound.

As can be seen in the electric impedance frequency characteristics shown in FIG. 9, the inherent resonance frequency f01 of the movable part 2 is around 100 Hz, and the inherent resonance frequency f02 of the vibrating plate 4 is around 2 kHz. The following advantages are achieved by generating frequencies at which the movable part 2 and vibrating plate 4 respectively resonate.

More specifically, an electro-mechanical-audio device A assembled into a mobile phone 6 generates signals at a predetermined frequency to an electric signal generator 7 based on instructions given from the main body of the mobile phone 6. This electric signal is input to the electro-mechanical-audio converter A to generate sound by vibrating the vibrating plate 4. The electric signal also vibrates the movable part 2 to vibrate the main body of the mobile phone 6 so as to notify the user of the arrival of an incoming call.

If either inherent resonance frequency of the movable part 2 or vibrating plate 4 is selected as a signal of the above predetermined frequency, the movable part 2 or vibrating plate 4 resonates and generates a strong vibration or beep sound. If both resonance frequencies are selected, a strong vibration and beep sound are emitted.

The above conventional electro-mechanical-audio converter A is described with reference to both vibration and beep sound. However, some conventional electro-mechanical-audio converting devices only generate a vibration or beep sound.

As shown in FIG. 10, the largest vibration power is achieved by the resonance frequency f01 of the movable part 2 because it has the heavier mass. The resonance frequency f02 of the vibrating plate 4 may generate a loud beep sound, but its vibration power is in fact extremely small.

As described above, the electric signal generator 7 generates a resonance frequency matching a inherent resonance frequency so as to generate a loud beep sound or vibration at the electro-mechanical-audio converter A. However, the inherent resonance frequency may change due to variations in environmental conditions such as ambient temperature of the electro-mechanical-audio converter A. Or, the oscillation frequency of the electric signal generator 7 may change slightly. As shown in FIG. 9, a slight change in frequency may cause a large change in oscillation output, particularly when generating vibrations. Unstable output may result in failing to alert the user of an incoming call by vibration.

The present invention aims to provide an electro-mechanical-audio converter and an electro-mechanical-audio converting device using the same that generate a stable oscillation output.

SUMMARY OF THE INVENTION

To solve the above-mentioned problems the electro-mechanical-audio converter of the present invention includes a housing having an opening; a movable part, forming a magnetic circuit, which is mounted on the opening of the housing through a suspension; a vibrating plate mounted on the opening of the housing but away from the movable part; a voice coil whose top end is connected to the vibrating plate and a bottom part is inserted in a magnetic gap of the movable part; and a detection coil, provided near the movable part, which generates an excitation voltage by vibration of the movable part. This configuration enables the detection coil to detect strong vibrations of the movable part during resonance as the excitation voltage and feed it back. Accordingly, the present invention offers the electro-mechanical-audio converter which achieves extremely stable vibration function even when resonance frequency changes due to variations in conditions including ambient temperature.

DESCRIPTION OF THE PREFERRED EMBODIMENTS

Figure 1A:
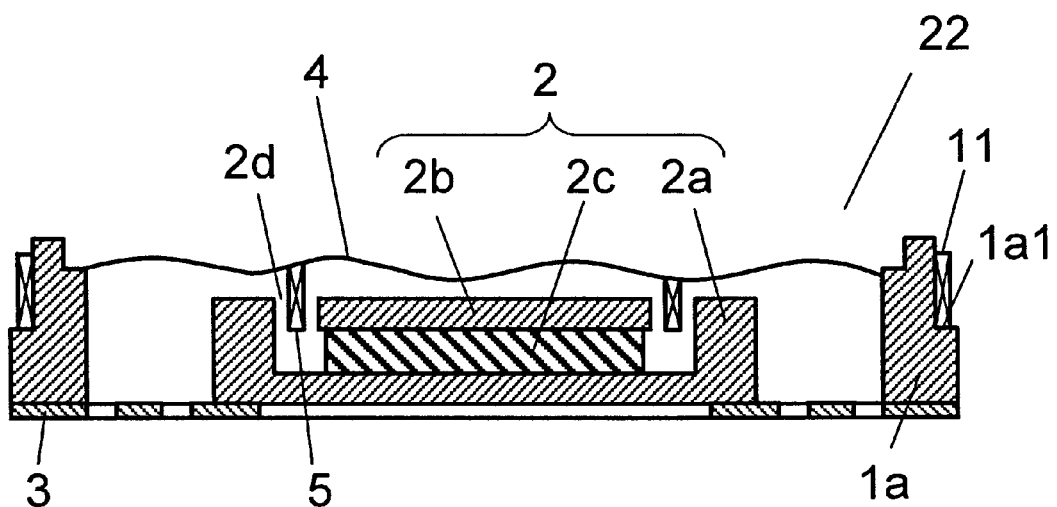
FIG. 1 (a) is a side sectional view of an electro-mechanical-audio converter in accordance with an exemplary embodiment of the present invention, FIG. 1 (b) is a side sectional view of the electro-mechanical-audio.

Exemplary embodiments of the present invention are described with reference to FIGS. 1(*a*) to 6.

First Exemplary Embodiment

A first exemplary embodiment of the present invention is described with reference to FIGS. 1(*a*) to 3. Parts same as the prior art are given the same reference numerals, and thus their description is omitted.

Figure 1B:
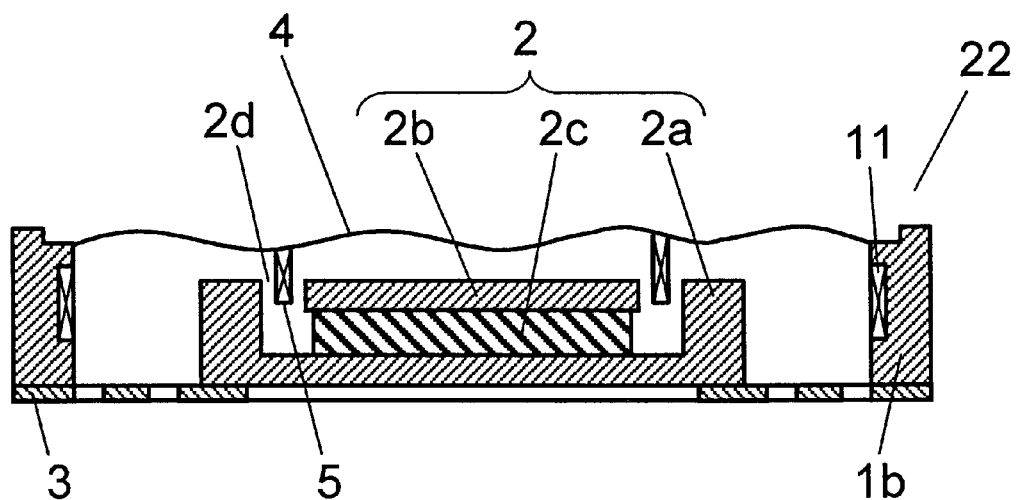

In FIGS. 1(*a*) to 3, a housing 1*a* has an opening at both ends, and a notched recess 1*a*1 is provided on its outer face. A detection coil 11 is made by winding a lead several times around the recess 1*a*1 of the housing 1*a*. Leakage flux of a movable part 2 interlinks with the detection coil 11 in the above configuration.

Figure 2:
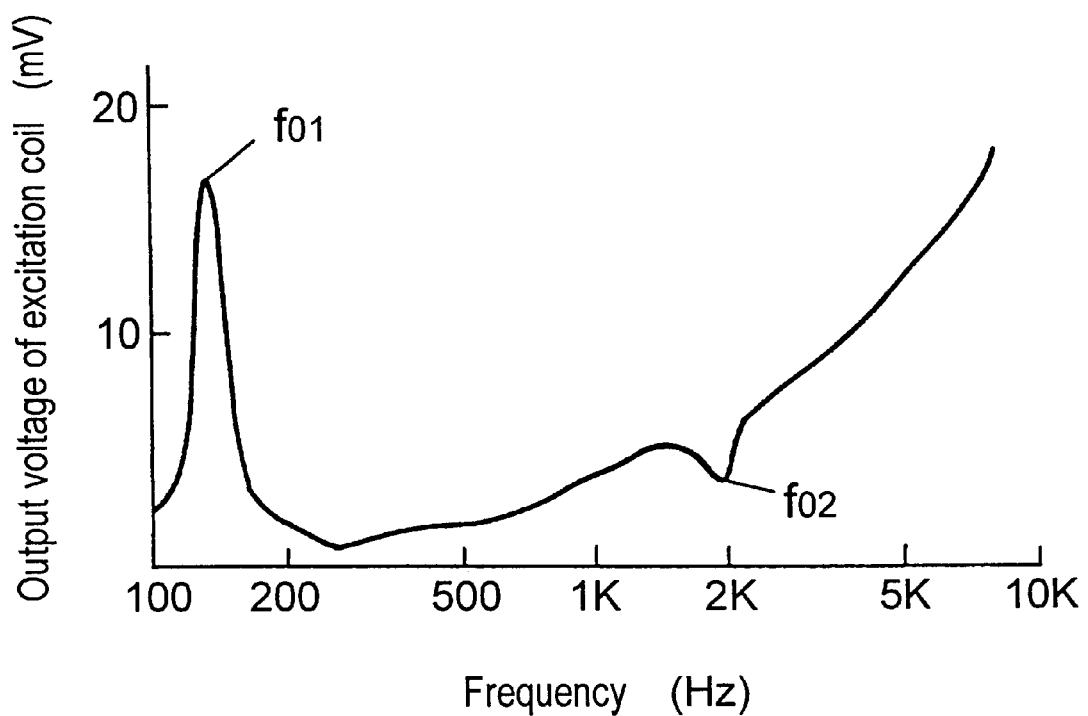
FIG. 2 is the output voltage-frequency characteristics of a detection coil, which is a key part of the electro-mechanical-audio converter.

Accordingly, when the movable part 2 resonates as a result of the input signal to the voice coil 5, the movable part 2 generates the strongest vibrations, and the aforementioned interlinked leakage flux similarly fluctuates with a large amplitude, producing a high excitation voltage in the detection coil 11 as shown by f01 in FIG. 2. In other words, the detection coil 11 detects the resonance frequency of the movable part 2 in the form of an excitation voltage.

Figure 3:
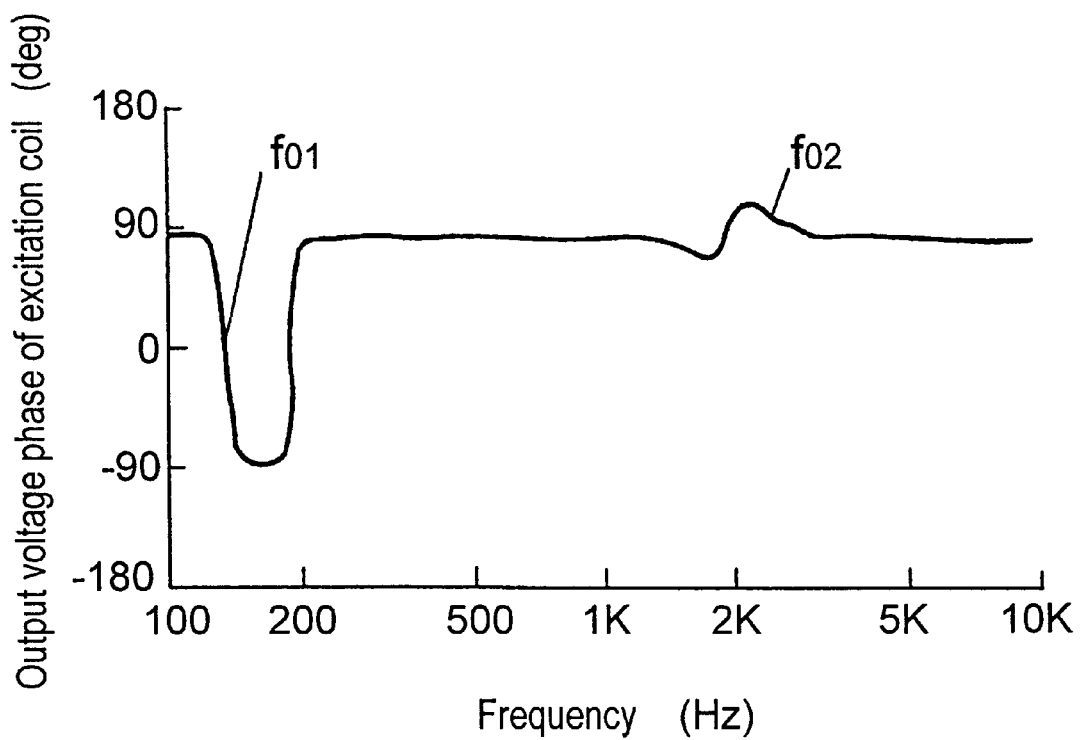
FIG. 3 shows the output voltage phase - frequency characteristics of the detection coil which is a key part of the electro-mechanical-audio converter.

It is apparent from FIG. 3 that the phase of the output voltage of the detection coil 11 in the resonance frequency shown in FIG. 2 matches in the same phase with that of the input signal. Accordingly, an electro-mechanical-audio converting device in a second exemplary embodiment generates a self-excited vibration by inputting the output of this detection coil 11 to an amplifier 21 of the electro-mechanical-audio converting device, which is described later.

The first exemplary embodiment has the additional advantage of the potential for setting the number of coils and type of lead of the detection coil 11 after completing the assembly of the electro-mechanical-audio converter in accordance with the required characteristics.

FIG. 1(*b*) is another example of the first exemplary embodiment. The detection coil 11 is integrally molded with the housing 1*b* by insert molding. The detection coil 11 embedded in the housing 1*b* ensures that dropping of the detection coil 11 due to, for example, looseness during assembly is preventable. The positional relation of the detection coil 11 and movable part 2 can also be maintained by insert molding, assuring reliable quality.

Second Exemplary Embodiment

Figure 4:
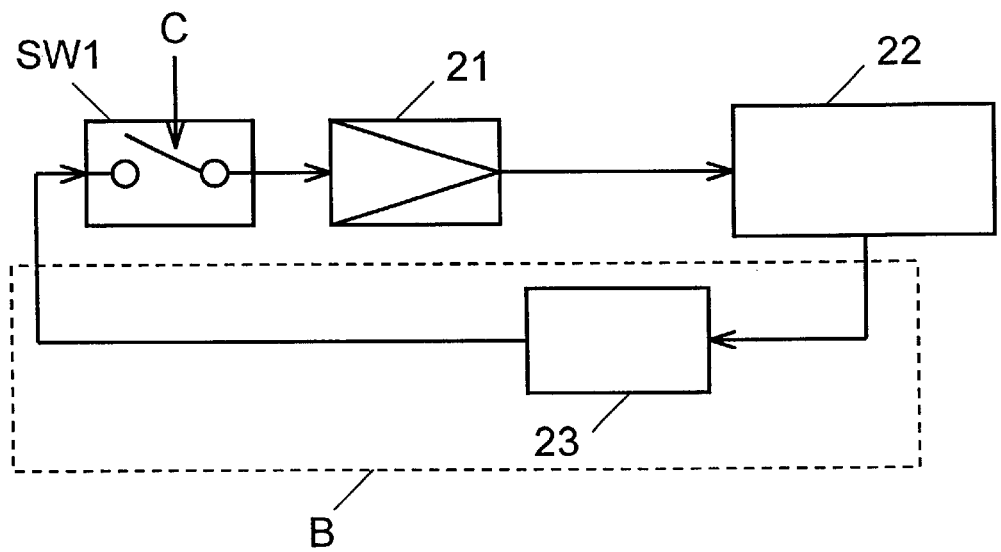
FIG. 4 is a block diagram of the electro-mechanical-audio converting device.

FIG. 4 is a block diagram of an electro-mechanical-audio converting device in an exemplary embodiment of the present invention. A switch SW1 switches between a paging vibration generator B and audio signal (including beep sound) in response to the receiving signal C, according to the FIG. 4. An amplifier 21 covers frequencies sufficiently lower than the low frequency (100 Hz) resonating with the movable part 2 up to audible frequency bands, and amplifies the output signal from the switch SW1. In addition, the amplifier 21 is set to match the phase of the output to input at least around the resonance point of the above low frequency so that stopping of self-excited oscillation due to phase deviation between the output and input is preventable. The output from the amplifier 21 is input to the voice coil 5 of an electro-mechanical-audio converter 22 described in the first exemplary embodiment. A detector 23 forms detecting means with the detection coil 11 of the electro-mechanical-audio converter 22. This detector 23 has an amplifying unit amplifying the output of the detection coil 11 in which phases of the input signal and output signal are matched, similar to the amplifier 21, around the resonance frequency of the movable part 2 (not required up to the audible frequency band). Its output is fed back to the amplifier 21 through the switch SW1.

Next, the operation of the above electro-mechanical-audio converting device is described. When paging vibrations are required by the receiving signal C, the switch SW1 is driven, and the paging vibration generator B, which is a feedback circuit including the detector 23, is driven. Noise (white noise) in the paging vibration generator B is first input to the electro-mechanical-audio converter 22. This noise contains a broad range of frequency components, and the electro-mechanical-audio converter 22 strongly vibrates at the inherent resonance frequency of its movable part 2. The detector 23 detects and amplifies this vibration in the form of the excitation voltage of the detection coil 11, and feeds it back to the amplifier 21 for further amplification. Amplified excitation: voltage is input again to the electro-mechanical-audio converter 22, and then further detected and amplified by the detector 23. The electro-mechanical-audio converter 22 generates so-called self-excited oscillation and finally generates noticeable vibration.

In other words, the above vibration generator B enables to produce noticeable vibration even from low-level noise signal.

The electro-mechanical-audio converter 22 also resonates (voltage f02 in FIGS. 2 and 3) at the inherent resonance frequency of the vibrating plate 4 (about 2 kHz) as described in the prior art. However, self-excited oscillation is not feasible in this case because the phase of the output voltage of the detection coil 11 is shifted by 90° relative to the input signal, as shown in FIG. 3.

The characteristics of the amplifying unit of the detector 23 may be selectable, and a low pass filter may be inserted at the output side of the detector 23 to ensure that only the feel of vibration is picked up.

In the second exemplary embodiment, the resonance point of the electro-mechanical-audio converter 22 is detected in the form of the excitation voltage of the detection coil 11. This enables the circuit configuration of the amplifier 21 to be simplified. Since relatively high voltage is achievable, the amplifying unit of the detector 23 may also be omitted or simplified as required.

Moreover, a limiter may be added to the output side of the detector 23 to stabilize vibrations generated by the electro-mechanical-audio converter 22 or to limit vibrations for preventing any damage to the device itself.

Third Exemplary Embodiment

Figure 5:
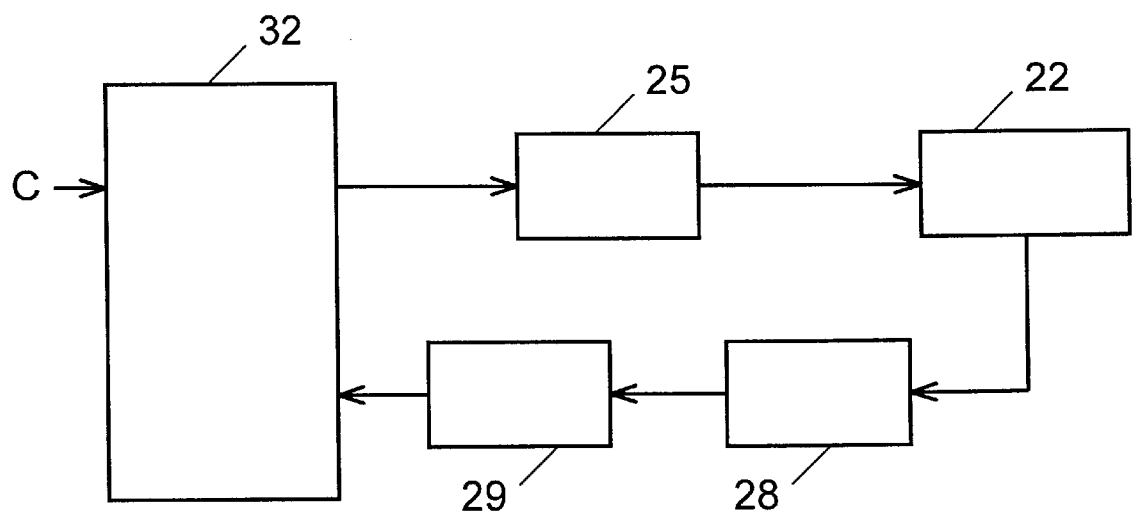
FIG. 5 is a block diagram of the electro-mechanical-audio converting device in accordance with another exemplary embodiment of the present invention.

FIG. 5 is a block diagram of another exemplary embodiment of the present invention. According to FIG. 5, an oscillator 25 generates a sweep signal to the electro-mechanical-audio converter 22. In this sweep signal, the frequency successively sweeps in a frequency band including the resonance frequency of the movable part 2 of the electro-mechanical-audio converter 22. At the same time, the oscillator 25 produces a frequency designated by a controller 32 described later. A detector 28 connected to the detection coil 11 of the electro-mechanical-audio converter 22 forms detecting means with the detection coil 11. A voltage comparator 29 detects a difference in potential between the output voltage of the detector 28 and a predetermined reference potential. The controller 32 gives instructions to the oscillator 25 whether to generate the 'sweep signal or the designated frequency based on the output from the voltage comparator 29.

The operation of the electro-mechanical-audio converting device as configured above is described below. First, the controller 32 directs the oscillator to generate a signal of a frequency band including the resonance frequency of the electro-mechanical-audio converter 22 as the sweep signal at relatively low level. The detector 28 detects this sweep signal in the form of the excitation voltage of the detection coil 11, and it is input to the voltage comparator 29.

At this point, as described in the first exemplary embodiment, the movable part 2 strongly vibrates at the resonance point of the movable part 2, and the excitation voltage in the detection coil 11 becomes larger. The voltage comparator 29 compares potential difference between the output voltage of the detector 28 including the excitation voltage at the resonance point and the predetermined reference potential. If the potential difference exceeds the reference potential, the controller 32 recognizes the frequency at this point as the resonance frequency, and oscillates the oscillator 25 at the recognized frequency by the designated output, and outputs it to the electro-mechanical-audio converter 22, which in turn is operated at this oscillation frequency. The movable part 2 is then strongly moved to produce noticeable vibration.

More specifically, a potential difference in the voltage comparator 29 at generating the sweep signal and a potential difference based on oscillation at the frequency recognized as the resonance frequency are preset in the controller 32. When the potential difference based on oscillation at the frequency recognized as the resonance frequency becomes lower than the preset value, the controller 32 directs the oscillator 25 to generate the sweep signal again to detect the resonance point of the movable part 2 in the electro-mechanical-audio converter 22 according to the aforementioned operation.

As described above, unlike the second exemplary embodiment, the third exemplary embodiment detects the resonance point of the movable part 2 of the electro-mechanical-audio converter 22 and employs the oscillator 25 for generating noticeable vibration. This enables the achievement of satisfactory response until the generation of noticeable vibration.

The oscillator 25 in the third exemplary embodiment is described as that having two functions: Generation of i) the sweep signal and ii) the resonance frequency at a predetermined resonance point. However, a separate oscillator may be employed for each function, and switched by a selector according to instructions given by the controller 32.

Moreover, functions to generate the sweep signal and resonance frequency signal at least for vibration may be provided to the oscillator (a function for generating a signal for a beep sound may also be added), and resonance frequency may be continuously detected based on time division multiplexing by the controller 32 in order to achieve vibration and/or beep sound (vibration and beep sound are executed alternately when simultaneously implementing vibration and beep sound).

Furthermore, at least the oscillator 25, controller 32, voltage comparator 29, and detector 28 after the detection coil 11 may be integrated into a microcomputer in the third exemplary embodiment.

Both of the electro-mechanical-audio converters in the first exemplary embodiment may be combined with the electro-mechanical-audio converting device in the second or third exemplary embodiment as required.

Fourth Exemplary Embodiment

Figure 6:
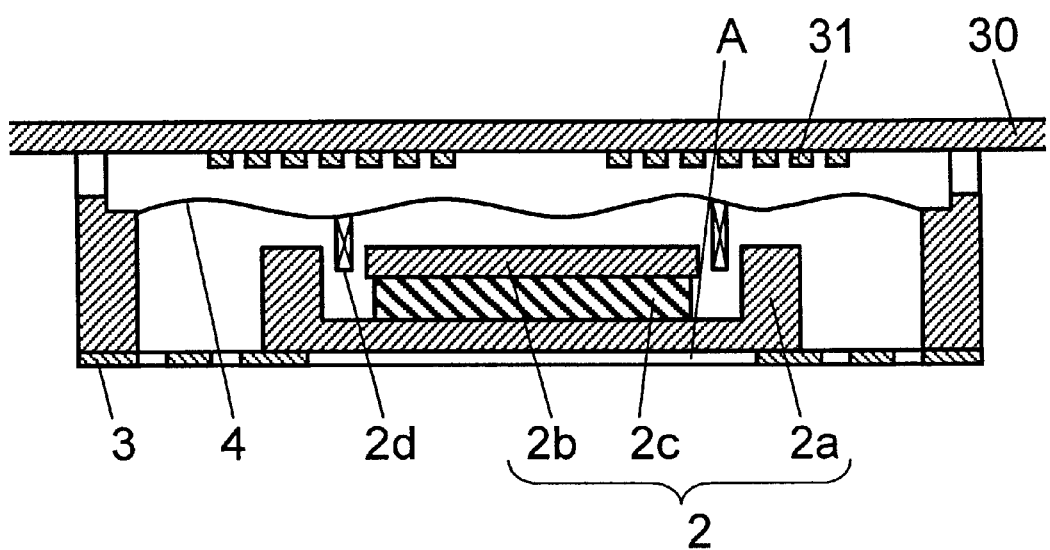
FIG. 6 is a sectional view of the electro-mechanical-audio converting device mounted on a printed circuit board which is a key part of the present invention.
Figure 7:
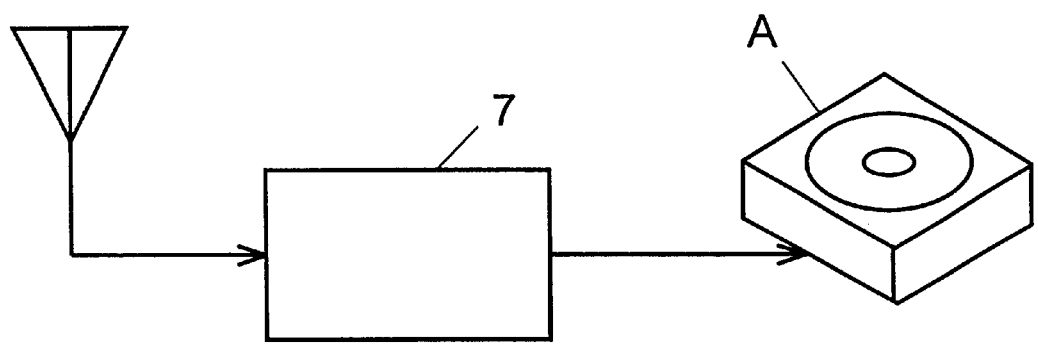
FIG. 7 is a conceptual block diagram of a conventional electro-mechanical-audio converting device.
Figure 8:
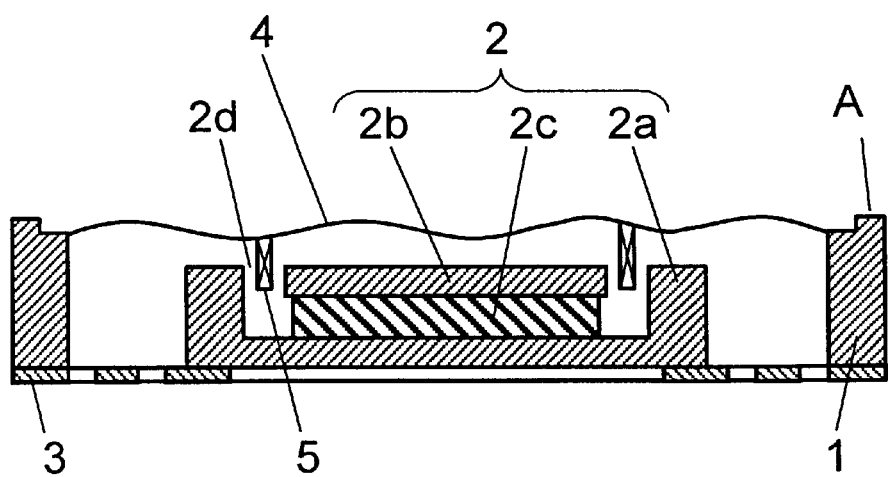
FIG. 8 is a side sectional view of the electro-mechanical-audio converter which is a key part of the conventional electro-mechanical-audio converting device.
Figure 9:
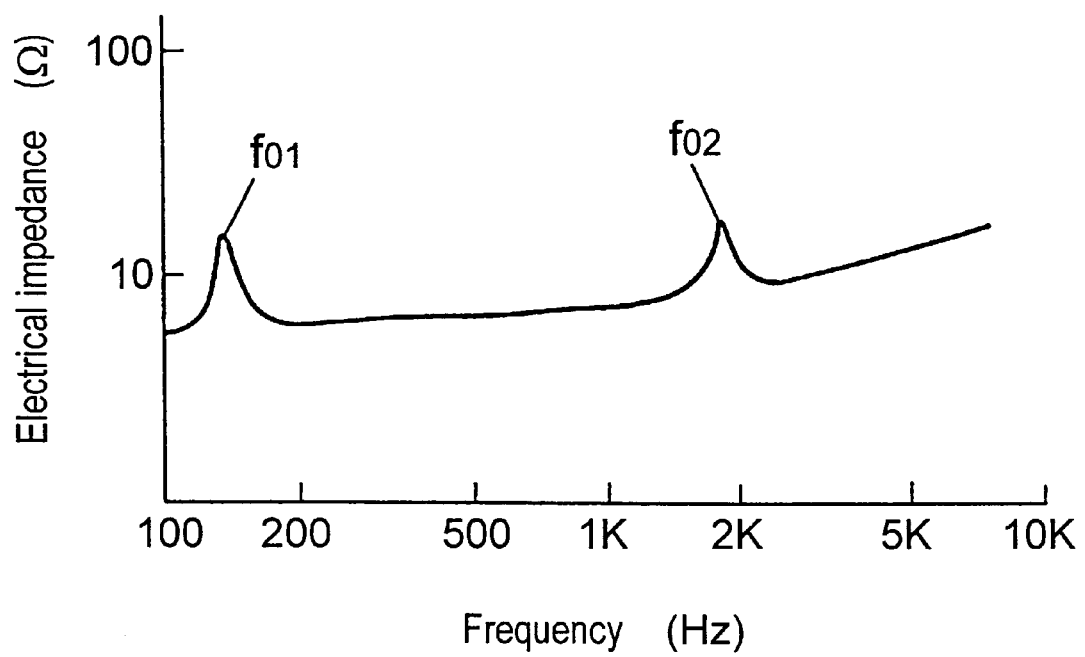
FIG. 9 shows the electrical impedance-frequency characteristics of the electro-mechanical-audio converter of the conventional electro-mechanical-audio converting device.
Figure 10:
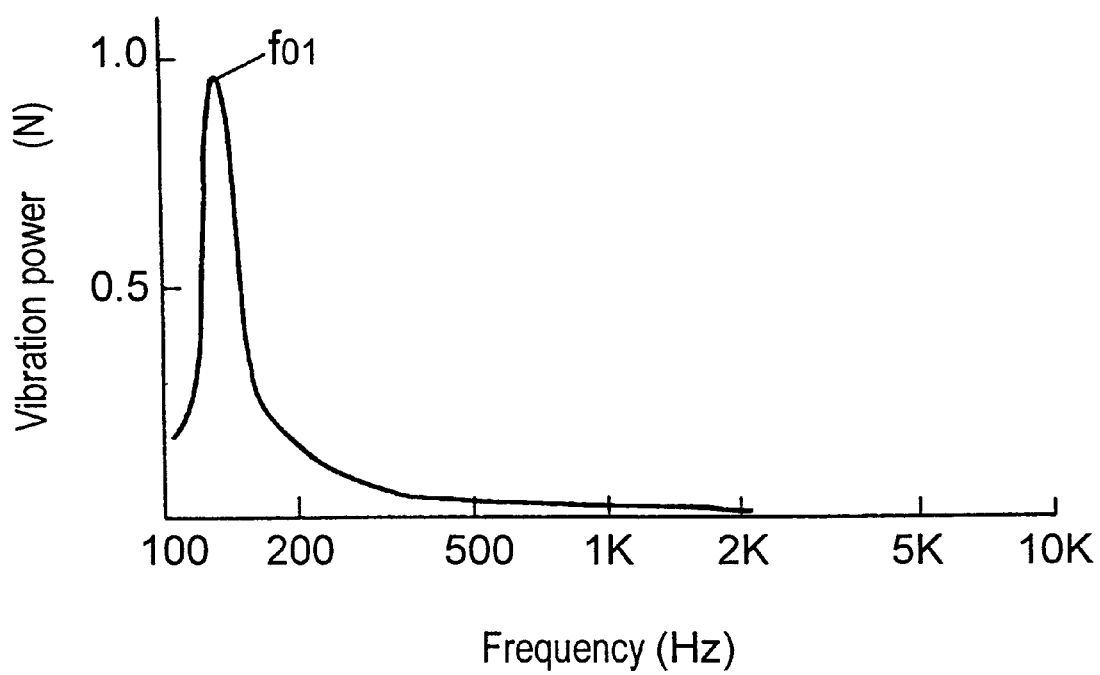
FIG. 10 shows the vibration power-frequency characteristics of the electro-mechanical-audio converter of the conventional electro-mechanical-audio converting device.
Figure 11:
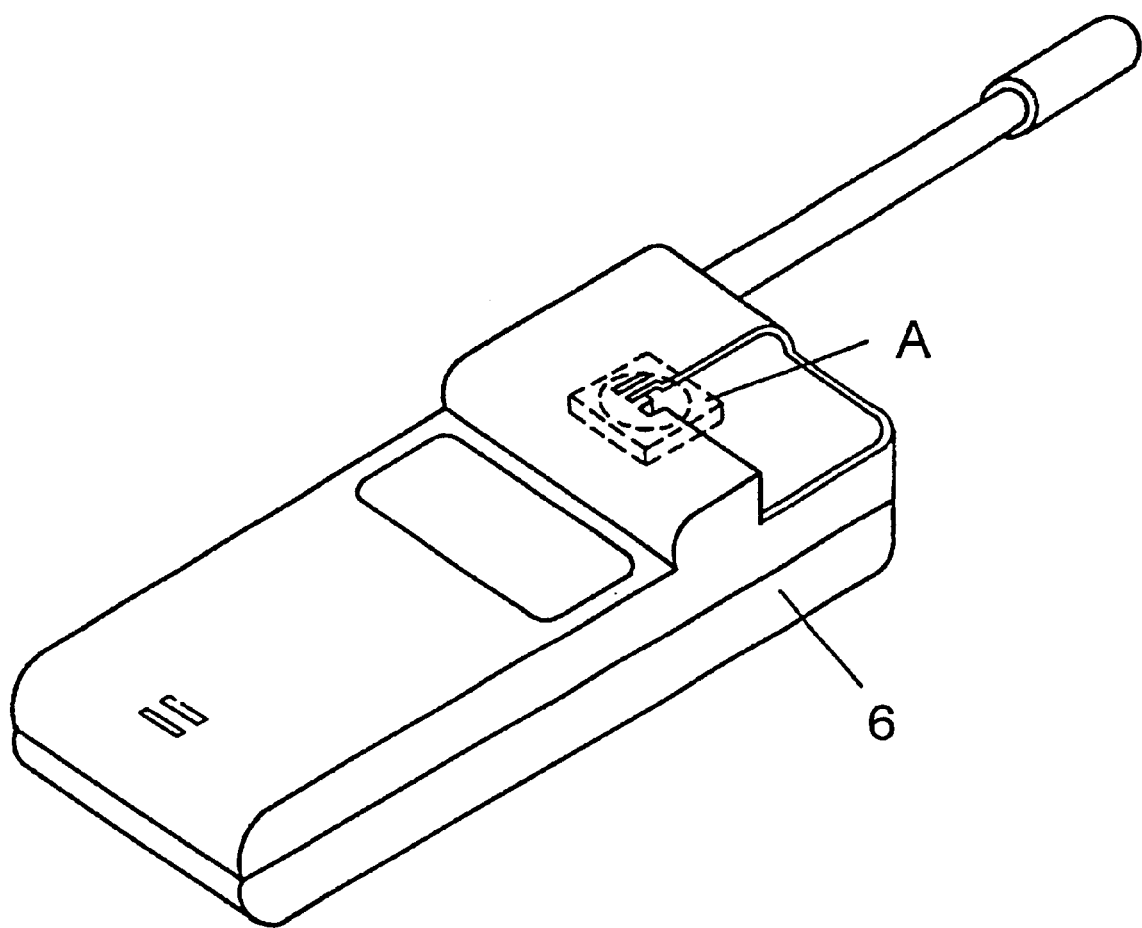
FIG. 11 is a perspective view of a mobile phone, one of mobile terminals, employing the conventional electro-mechanical-audio converting device.

FIG. 6 shows the case that a spiral printed coil 31 is provided directly below a printed circuit board 30 such as a flexible printed circuit board-at the position where the conventional electro-mechanical-audio converter A is mounted, instead of disposing the detection coil 11a on the electro-mechanical-audio converter 22 as in the first exemplary embodiment.

This configuration allows to mount the detection coil 11a on the printed circuit board 30 in the same way as electrical circuits other than electro-mechanical-audio converter 22 described in FIG. 4 for the second exemplary embodiment and FIG. 5 for the third exemplary embodiment. Accordingly, an inexpensive conventional electro-mechanical-audio converter A with simple configuration may be employed. In addition, formation of the coil directly below the electro-mechanical-audio converter A enables to save the space. Still more, formation of the coil simultaneously at forming a circuit pattern on the printed circuit board 30 enables to suppress the increase in the number of components.

Industrial Applicability

The electro-mechanical-audio converter of the present invention includes a housing having an opening; movable part which forms a magnetic circuit and is mounted on the opening of this housing through a suspension; vibrating plate mounted on the opening of the housing away from this movable part; voice coil whose top end is connected to this vibrating plate and a bottom part is embedded in a magnetic gap of the movable part; and detection coil provided close to the movable part and which generates excitation voltage by vibration of the movable part. This configuration enables the detection coil to detect and feed back strong vibration of the movable part during resonance in the form of the excitation voltage. Accordingly, the electro-mechanical-audio converter which has an extremely stable vibration function, even the resonance frequency changes due to any environmental changes such as ambient temperature, can be offered.

Still more, the electro-mechanical-audio converter having the detection coil wound around the housing enables to handle the detection coil together with the housing. This realizes a compact body, and contributes to reducing the component assembly man-hours. Material, diameter, and number of windings of the detection coil may also be selected and formed later in accordance with requirements of electrical circuits. Accordingly, the present invention offers an extremely flexible electro-mechanical-audio converter.

The electro-mechanical-audio converter, in which the detection coil wound to the housing is integrally molded with the housing, enables to handle the detection coil together with the housing. This realizes a compact body, and contributes to reducing the component assembly man-hours. The detection coil may also be protected from external damages. Deviation in positional relation between the detection coil and the movable part may also be suppressed. This contributes to the stable quality.

The electro-mechanical-audio converting device of the present invention includes an amplifier, an electro-mechanical-audio converter having resonance frequency and formed by a movable part having at least a magnetic circuit for converting electric signals amplified by the amplifier to vibrations or sound, and coil element; and a detector for detecting frequency signals in the resonance frequency of the movable part of the electro-mechanical-audio converter and outputting it to the amplifier. Noise generated from the electric circuit at least including the amplifier or detector is input to the amplifier. This allows to feed back information on resonance frequency from the detector, making it advantageous for achieving extremely stable self-excited vibration by resonance using a broad range of noise generated in the circuit itself without employing a special oscillator.

The electro-mechanical-audio converting device includes a detector and the amplifier which output the output signal having the same phase as respective input signal around the resonance frequency band of the movable part. This assures self-excited vibration.

The electro-mechanical-audio converting device, which includes a detector having at least the detection coil disposed near the movable part that generates the excitation voltage by vibration of the movable part, enables the detection coil to detect and feed back strong vibration of the movable part during resonance in the form of the excitation voltage. This allows an extremely stable vibration function even when the resonance frequency changes by environmental changes such as ambient temperature.

The electro-mechanical-audio converting device, to which a limiter for limiting the output of the detector is inserted at the output side of the detector, enables to achieve stable vibration of the movable part during resonance by limiting the output of self-excited vibration.

The electro-mechanical-audio converting device in which the detection coil is wound around the housing of the electro-mechanical-audio converter enables to handle the detection coil together with the electro-mechanical-audio converter. This prevents the increase of the number of components, contributing to the reduction of assembly man-hours. At the same time, detection accuracy improves by providing the detection coil at the side of the electro-mechanical-audio converter.

The electro-mechanical-audio converting device in which the detection coil is integrally molded in the state that the detection coil is wound around the housing of the electro-mechanical-audio converter enables to handle the detection coil with the electro-mechanical-audio converter. This prevents the increase of the number of components, contributing to the reduction of the assembly man-hours. At the same time, detection accuracy improves by providing the detection coil at the side of the electro-mechanical-audio converter. Integrated molding further stably maintains the positional relation of the detection coil and movable part of the electro-mechanical-audio converter, contributing to stabilization of characteristics.

The present invention in which the detection coil is formed on a printed circuit board directly below a printed circuit board where the electro-mechanical-audio converter is mounted allows the use of the conventional electro-mechanical-audio converter with simple configuration, resulting in offering an inexpensive device. In addition, formation of the detection coil directly below the electro-mechanical-audio converter saves space. The number of components may also be suppressed by forming the detection coil at the time of forming a circuit pattern on the printed circuit board 30.

The electro-mechanical-audio converting device of the present invention includes an electro-mechanical-audio converter having at least one resonance frequency and including a movable part having a magnetic circuit for converting electric signals into vibration or sound and coil element; an oscillator for generating frequency signal in a frequency band including the resonance frequency of the movable part of this electro-mechanical-audio converter and outputting it to the electro-mechanical-audio converter; a detector for detecting frequency of a predetermined output level of said electro-mechanical-audio converter as the resonance frequency, said detector including a detection coil for generating excitation voltage according to vibration of said movable part, said detection coil disposed near said movable part; and a controller for controlling the oscillator so as to generate frequency signals in the frequency band including resonance frequency of the electro-mechanical-audio converter and frequency detected as the resonance frequency by the oscillator using time division multiplexing so that the oscillator oscillates at frequency detected by the detector as the resonance frequency. The use of time division multiplexing in the controller enables the oscillator to generate frequency signal in the frequency band including the resonance frequency even when the resonance frequency changes during resonance by environmental changes such as ambient temperature. Accordingly stable resonance and resulting vibration is always achievable.

The electro-mechanical-audio converting device includes an electro-mechanical-audio converter having at least one resonance frequency and including a movable part having a magnetic circuit for converting electric signals into vibration or sound and coil element; an oscillator which sweeps and generates frequency signal of the frequency band including the resonance frequency of the movable part of the electro-mechanical-audio converter, and outputs the electric signal to the electro-mechanical-audio converter; a detector for detecting the output of said electro-mechanical-audio converter and outputting it as the output voltage, said detector having a detection coil generating excitation voltage by vibration of said movable part, said detection coil disposed near said movable part; a voltage comparator for notifying a controller of a resonance point of the movable part in the electro-mechanical-audio converter when output voltage from the detector exceeds the reference potential; and the controller for sending the frequency at the time of receiving this notification to the oscillator. This configuration facilitates the detection of frequency at the resonance point, and enables to achieve stable resonance and resulting vibration.

Reference Numerals 1, 1a, 1b housing
1a1 recess
2 movable part
2a yoke
2b magnet
2c plate
2d magnetic gap
3 suspension
4 vibrating plate
5 voice coil
6 mobile phone
7 electric signal generator
11 detection coil
21 amplifier
22, A electro-mechanical-audio converter
23, 28 detector
25 oscillator
29 voltage comparator.
30 printed circuit board
31 printed coil
32 controller
B vibration generator
SW1 switch

What is claimed is:

1. An electro-mechanical/audio converter comprising:
   a housing having a first opening end and a second opening end;
   a movable part including a magnetic circuit;
   a suspension for mounting said movable part on said housing near said first opening end for supporting said movable part so that it is movable;
   a vibrating plate mounted on said housing near said second opening end, said vibrating plate being disposed away from said movable part;
   a voice coil whose top end is connected to said vibrating plate and whose bottom part is inserted in a magnetic gap of said movable part; and
   a detection coil wound around said housing and disposed near said movable part, said detection coil generating excitation voltage by vibration of said movable part.

2. The electro-mechanical/audio converter as defined in claim 1, wherein said detection coil is integrally molded in the state of being wound around said housing.

3. An electro-mechanical/audio converting device comprising:
   an amplifier;
   an electro-mechanical/audio converter including a housing having a first opening end and a second opening end, a movable part including a magnetic circuit, a suspension for mounting said movable part on said housing near said first opening end for supporting said movable part so that it is movable, a vibrating plate mounted on said housing near said second opening end, said vibrating plate being disposed away from said movable part, a voice coil whose top end is connected to said vibrating plate and whose bottom part is inserted in a magnetic gap of said movable part, and a detection coil wound around said housing and disposed near said movable part, said detection coil generating excitation voltage by vibration of said movable part, said movable part having a resonance frequency and said magnetic circuit converting electric signal amplified by said amplifier to at least one of vibration and sound; and
   a detector for detecting the resonance frequency of said movable part and outputting it to said amplifier, said detector including said detection coil;
   wherein noise generated from an electric circuit at least including said amplifier and said detector is input to said amplifier.

4. The electro-mechanical/audio converting device as defined in claim 3 wherein each of the said frequency detector and said amplifier outputs respective output signal having the same phase to respective input signal in the frequency band close to the resonance frequency of said movable part.

5. The electro-mechanical/audio converting device as defined in claim 3, further comprising a limiter for limiting the output of said detector at the output side of said detector.

6. The electro-mechanical/audio converting device as defined in claim 4, wherein said detection coil is integrally molded in the state of being wound around said housing of electro-mechanical/audio converter.

7. An electro-mechanical/audio converting device comprising:
   an electro-mechanical/audio converter comprising a housing having a first opening end and a second opening end, a movable part including a magnetic circuit, a suspension for mounting said movable part on said housing near said first opening end for supporting said movable part so that it is movable, a vibrating plate mounted on said housing near said second opening end, said vibrating plate being disposed away from said movable part, a voice coil whose top end is connected to said vibrating plate and whose bottom part is inserted in a magnetic gap of said movable part, and a detection coil wound around said housing and disposed near said movable part, said detection coil generating excitation voltage by vibration of said movable part, wherein said movable part having at least one resonance frequency and said magnetic circuit converting electric signal into at least one of vibration and sound;
   an oscillator for generating an electric signal with frequency in a frequency band including a resonance frequency of said movable part in said electro-mechanical/audio converter and outputting it to said electro-mechanical/audio converter;
   a detector for detecting frequency of a predetermined output level of said electro-mechanical/audio converter as the resonance frequency, said detector including said detection coil; and
   a controller controlling said oscillator to generate the signal with the frequency of the frequency band including the resonance frequency of said electro-mechanical/audio converter and a signal with a frequency detected as the resonance frequency by said detector, using time division multiplexing.

8. The electro-mechanical/audio converting device as defined in claim 7, wherein said detection coil is integrally molded in the state of being wound around said housing of said electro-mechanical/audio converter.

9. An electro-mechanical/audio converting device comprising:

an electro-mechanical/audio converter including a housing having a first opening end and a second opening end, a movable part including a magnetic circuit, a suspension for mounting said movable part on said housing near said first opening end for supporting said movable part so that it is movable, a vibrating plate mounted on said housing near said second opening end, said vibrating plate being disposed away from said movable part, a voice coil whose top end is connected to said vibrating plate and whose bottom part is inserted in a magnetic gap of said movable part, and a detection coil wound around said housing and disposed near said movable part, said detection coil generating excitation voltage by vibration of said movable part, wherein said movable part having at least one resonance frequency and said magnetic circuit for converting electric signal to at least one of vibration and sound;

an oscillator for sweeping and oscillating electric signal with frequency in a frequency band including the resonance frequency of said electro-mechanical/audio converter and outputting said electric signal to said electro-mechanical/audio converter;

a detector for detecting the output of said electro-mechanical/audio converter and outputting it as the output voltage, said detector having said detection coil;

a voltage comparator notifying a controller of a resonance point of said electro-mechanical/audio converter when the output voltage from said detector exceeds a reference potential; and said controller for sending a frequency of said resonance point at the time of receiving notification to said oscillator.

10. The electro-mechanical/audio converting device as defined in claim 9, wherein said detection coil is integrally molded in the state of being wound around said housing of said electrical/audio converter.

11. An electro-mechanical/audio converter comprising:

a housing having a first opening end and a second opening end;

a movable part including a magnetic circuit;

a suspension for mounting said movable part on said housing near said first opening end for supporting said movable part so that it is movable;

a vibrating plate mounted on said housing near said second opening end, said vibrating plate being disposed away from said movable part;

a voice coil whose top end is connected to said vibrating plate and whose bottom part is inserted in a magnetic gap of said movable part; and a detection coil disposed in a recess in said housing and near said movable part, said detection coil generating excitation voltage by vibration of said movable part.

12. An electro-mechanical/audio converting device comprising:

an amplifier;

an electro-mechanical/audio converter including a movable part having resonance frequency and at least having a magnetic circuit for converting electric signal amplified by said amplifier to at least one of vibration and sound, and a coil element; and a detector for detecting the resonance frequency of the movable part in said electro-mechanical/audio converter and outputting it to said amplifier, wherein noise generated from an electric circuit at least including said amplifier and said detector is input to said amplifier, said detector has a detection coil which is disposed near said movable part and generates excitation voltage by vibration of said movable part, and said detection coil is formed on a printed circuit board on which said electro-mechanical/audio converter is mounted.

13. An electro-mechanical/audio converting device comprising:

an electro-mechanical/audio converter comprising a movable part having at least one resonance frequency and having a magnetic circuit for converting electric signal into at least one of vibration and sound, and a coil element;

an oscillator for generating an electric signal with frequency in a frequency band including the resonance frequency of said movable part in said electro-mechanical/audio converter and outputting it to said electro-mechanical/audio converter;

a detector for detecting frequency of a predetermined output level of said electro-mechanical/audio converter as the resonance frequency, said detector including a detection coil for generating excitation voltage according to vibration of said movable part, said detection coil disposed near said movable part; and a controller controlling said oscillator to generate the electric signal with frequency of the frequency band including resonance frequency of said electro-mechanical/audio converter and a signal with a frequency detected as the resonance frequency by said detector using time division multiplexing;

wherein said detection coil is formed on a printed circuit board on which said electro-mechanical/audio converter is mounted.

14. An electro-mechanical/audio converting device comprising:

an electro-mechanical/audio converter including a movable part having at least one resonance frequency and having a magnetic circuit for converting electric signal into at least one of vibration and sound, and a coil element;

an oscillator for sweeping and oscillating an electric signal with frequency in a frequency band including the resonance frequency of said electro-mechanical/audio converter and outputting said electric signal to said electro-mechanical/audio converter;

a detector for detecting the output of said electro-mechanical/audio converter and outputting it as the output voltage, said detector having a detection coil generating excitation voltage by vibration of said movable part, said detection coil disposed near said movable part;

a voltage comparator notifying a controller of a resonance point of said electro-mechanical/audio converter when the output voltage from said detector exceeds a reference potential; and said controller for sending said frequency of said resonance point at the time of receiving notification to said oscillator;

wherein said detection coil is formed on a printed circuit board on which said electro-mechanical/audio converter is mounted.

* * * * *